(12) United States Patent
Su et al.

(10) Patent No.: US 7,345,999 B2
(45) Date of Patent: Mar. 18, 2008

(54) METHODS AND DEVICES FOR THE RETRANSMISSION OF DATA PACKETS

(75) Inventors: Hsuan-Jung Su, Ocean, NJ (US); Qinqing Zhang, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1117 days.

(21) Appl. No.: 10/198,020

(22) Filed: Jul. 18, 2002

(65) Prior Publication Data

US 2004/0013114 A1   Jan. 22, 2004

(51) Int. Cl.
*H04L 12/28* (2006.01)
*H04L 1/18* (2006.01)
*H04B 1/44* (2006.01)
*H04B 7/216* (2006.01)
*H04J 3/24* (2006.01)

(52) U.S. Cl. ............ 370/231; 370/235; 370/253; 370/282; 370/335; 370/342; 370/474; 714/749

(58) Field of Classification Search ......... 714/748–749
See application file for complete search history.

(56) References Cited

U.S. PATENT DOCUMENTS

| 4,896,151 | A  * | 1/1990  | Kuranami et al. ..... 340/825.52 |
| 5,130,986 | A  * | 7/1992  | Doshi et al. ................. 370/231 |
| 5,444,718 | A  * | 8/1995  | Ejzak et al. ................ 714/748 |
| 5,502,733 | A  * | 3/1996  | Kishi et al. ................. 714/748 |
| 6,292,470 | B1 * | 9/2001  | Uota .......................... 370/252 |
| 6,335,933 | B1 * | 1/2002  | Mallory ..................... 370/394 |
| 6,643,813 | B1 * | 11/2003 | Johansson et al. .......... 714/748 |
| 6,778,501 | B1 * | 8/2004  | Malmgren et al. .......... 370/236 |

* cited by examiner

*Primary Examiner*—Melanie Jagannathan

(57) ABSTRACT

The present invention provides techniques for the retransmission of packets of data. One device comprises a transmission unit adapted to retransmit all previously transmitted packets transmitted during a predetermined time interval, instead of just a single packet, when a received signal indicates that at least one previously transmitted packet contains corrupted data.

9 Claims, 3 Drawing Sheets

METHODS AND DEVICES FOR THE RETRANSMISSION OF DATA PACKETS

FIELD OF THE INVENTION

This invention relates to the fields of wireless and wire line communication networks and, more specifically, to methods and devices for the retransmission of data packets between nodes in a communication network.

BACKGROUND OF THE INVENTION

A common function of a data communication system is to successfully send data "packets" containing desired information from a transmission point or node to a reception point or node. Before going further, it should be understood that the term "node" may indicate one or more hardware, software or firmware elements which may be combined or used separately to carry out transmission and/or reception of packets, etc . . . In order for such a system to perform efficiently, bits of information are grouped together to form an "upper layer frame". Upper layer frames are then further subdivided or concatenated into packets of data, the basic units used for transmission in a communication network.

A communication network's efficiency is measured by how many packets it can successfully send from a transmission node to a reception node in a given time period. This measurement is known as a network's "throughput". Another measure of network efficiency is the amount of time it takes for a packet to get from a transmission node to a reception node. This performance metric is known as "delay". An ideal communication network will transmit the maximum amount of packets between network nodes in the least amount of time.

Several factors prevent both wire line and wireless communication networks from achieving ideal throughput and delay performance. Principally among them are transmission failures caused by interference, weak transmissions or faulty reception. One known technique used to minimize network transmission failures utilizes an Automatic Repeat Request (ARQ) retransmission method of error correction. ARQ retransmission uses a "reverse acknowledgement channel". This channel can be a stand-alone channel or multiplexed with a "reverse data channel". A reverse acknowledgement channel allows a reception node to provide a transmission node with the status of transmitted packets. These status messages are aptly called "acknowledgements".

ARQ retransmission is used, for example, in a radio link control protocol developed for third generation, 3G communication networks (3G is short for third generation, 3GPP/UMTS radio link protocol communication networks). These networks support wireless bandwidth requirements for telephone calls, global positioning systems, email, Internet access, videoconferencing and streaming audio and video. Today, 3G networks allow data to be transmitted between a transmission node and reception node over a range of 8 kb/sec to 2 MB/sec. Future enhancements may enable 3G networks to transmit data up to 10 MB/sec. An efficient ARQ retransmission method is essential in order to maintain network protocol integrity for commercial applications, especially when it comes to 3G networks which require high data transfer rates.

Before describing the details of the present invention, it may be helpful to first present a simplified explanation of ARQ retransmission and how it applies to 3G networks.

Referring to FIG. 1, there is depicted a simplified block diagram of a conventional communication network 100 comprising a communications channel 110, an acknowledgement channel 112, a reception node 104 and a transmission node 102. In an existing ARQ retransmission method, the transmission node 102 is adapted to send packets stored in a memory unit 106, which can also be referred to as a transmission buffer, along the communication channel 110 to a reception memory unit 108, which can also be referred to as a reception buffer, for examination. Circuitry in the reception node 104 is adapted to examine the incoming packets in the reception memory unit 108 to determine whether they have been transmitted successfully, as further discussed below. If the reception node 104 receives a packet that contains corrupted data, the reception node 104 is adapted to send a status or acknowledgement message back to the transmission node 102 on the acknowledgement channel 112. More to the point, the reception node 104 will only be adapted to send an acknowledgement when corrupted data is received. This type of ARQ retransmission method is known in the art as a "negative" acknowledgement (NACK) method.

Alternatively, the reception node 104 may be adapted to send an acknowledgement via the acknowledgement channel 112 to the transmission node 102 only when it is determined that a packet sent via communication channel 110 has been received without errors. This type of ARQ retransmission method is known in the art as a "positive" acknowledgement method. In this method, the transmission node 102 is adapted to wait for a predetermined time period to receive an acknowledgement from the reception node 104. If an acknowledgement is not received within the predetermined time period, the transmission node 102 is adapted to retransmit the unacknowledged packet stored in the memory unit 106 to the reception node 104.

It is known in the art that positive and negative ARQ retransmission methods can be combined into a "general" ARQ retransmission method where acknowledgements are sent from a reception node to a transmission node on an acknowledgement channel for every previously transmitted packet in a memory unit. Based on the received acknowledgements, the transmission node will be adapted to determine whether a given previously transmitted packet stored in the memory unit needs to be retransmitted to the reception node. Generally, the transmission node is adapted to wait until it receives an acknowledgement before it makes any decision on whether to continue to hold previously transmitted packets in the memory unit or to clear the unit for the next incoming stream of packets.

As mentioned above, a specific use of a general ARQ retransmission method is in 3G networks. Within a so-called "protocol stack" of a 3G network, a radio link control (RLC) layer contains protocols (e.g., a series of set instructions) used to carry out ARQ retransmission. FIG. 2 is a simplified block diagram illustrating components of an RLC layer 200 relevant to our discussion. As shown, layer 200 comprises a transmission unit 202 and reception unit 210.

The path of a packet can be traced through the RLC layer 200. Upper layer(s) 102u send upper layer frames to the transmission unit 202 which is adapted to process such frames as follows. Before the upper layer frames can be transmitted, segmenting unit 204 is adapted to segment and/or concatenate them into packets. Thereafter, an RLC header unit 206 is adapted to add an RLC header to each packet. Packets are then placed in the memory unit 106 to wait for transmission. (Note that the memory unit may function as either a transmission buffer or a retransmission buffer and/or that the functions of these elements may be implemented by either one or multiple elements). A multiplexer circuit 208 is adapted to select which packets from memory unit 106 will be transmitted during a next "transmission time interval" (TTI) and to calculate when the selected packets will be submitted to a lower layer 102*l* for actual transmission. If the memory unit 106 is implemented using separate transmission and retransmission elements, the selected packets can come from the transmission buffer element, the retransmission buffer element or both.

In an alternative embodiment of the present invention, a Medium Access Control ("MAC") layer (not shown) determines the number of packets which can be transmitted per TTI and sends this information to RLC Layer 200 via pathway 300. Header unit 206 is then further adapted to set certain fields, which may represent a variety of protocol variables, within each packet selected for transmission.

Subsequently, selected packets are transmitted via transmission lower layer section 102*l* to reception lower layer 104*l*.

The reception section 210 is adapted to receive transmitted packets from the reception lower layer 104*l*. An expansion unit 212 is adapted to expand the received packets into separate packets and to place them in the reception memory unit 108 until packets associated with an entire reconstructed upper layer frame have been received.

At this point, the reception section 210 is adapted to generate and send acknowledgements and status information on individual packets stored in the reception memory unit 108 to the transmission section 202 as follows. An acknowledgment unit 214 is adapted to analyze whether the packets within the reception memory unit 108 have been received without errors. The acknowledgement unit 214 is further adapted to send this information to a transmission unit 216 via reverse link 212. (A separate element, such as a reception node transmission unit, may also be adapted to send this information.)

Unit 216 is adapted to control the multiplexer circuit 208 in order to select packets for transmission during the next TTI. If a packet is negatively acknowledged by the acknowledgement unit 214, the transmission unit 216 is adapted to retransmit only the negatively acknowledged packet. When a packet is successfully received and acknowledged, a reception header unit 218 in the reception section 210 is adapted to remove the RLC header from the packet, reassemble the frame and send the reassembled frame to upper layer 104*u*.

It is generally believed that frequent acknowledgements allow retransmissions to be carried out quickly, which benefits delay performance and overall system efficiency. In addition, frequent acknowledgements allows the memory unit 106 (transmission buffer) to be cleared more frequently. This reduces the likelihood that the memory unit 106 will overflow. Furthermore, frequent acknowledgements can prevent instances of protocol stalling, which occurs when transmission node 102 is unable to transmit packets even though there are packets available for transmission in memory unit 106.

On the other hand, frequent acknowledgements consume the bandwidth of the reverse link 112, degrade the throughput and delay performance of the reverse link 112 and interfere with other transmissions.

For the reasons just stated, as well as others, the existing technique of individually retransmitting each negatively acknowledged packet for a given upper layer frame is unacceptable. Retransmissions should be managed in a way so that error correction can be invoked as fast as possible, but at the same time utilized conservatively in order to avoid excessive delays.

An additional problem with existing ARQ retransmission methods is that, in operation, many factors can interfere with acknowledgement signals so that they are not properly received by a transmission node. In sum, in ARQ retransmission, the transmission node may not always receive accurate acknowledgement information from a reverse channel. Such inaccuracies can lead to spurious or unnecessary retransmission in some cases, or a lack of proper retransmission in others. In most cases, retransmission of packets must wait until the next uncorrupted acknowledgement arrives from the reception node. This causes serious delays and adversely affects the overall performance of a network.

Though, in general, retransmission can increase the probability of a successful transmission and thus reduce delay, yet another problem with existing retransmission techniques is that frequent retransmissions decrease throughput. When the transmission node has to retransmit individual packets over and over again due to an error in the original transmission, the amount of packets that can be sent to the reception node over a given period of time decreases.

There is, therefore, a need in the art of wireless and wire line communications for retransmission techniques that will balance the need to transmit packets free of corrupted data while considering the overall efficiency and performance of the communication network.

There is also a need in the art for techniques which rectify transmission errors in 3G and other communications networks in order to improve the throughput of the system and reduce packet delay time. Such methods and devices would ideally take advantage of the fact that packets transmitted during the same predetermined time interval using a RLC protocol, as well as many other protocols, have the same error correction code. That is, it is very likely that if at least one transmitted packet for a given time interval is corrupted, then all of the transmitted packets with the same encoding structure will likely be corrupted as well. In the art, this is known as "burst error" behavior. Other "burst errors" are caused by fading channel characteristics. For example, packets transmitted during "deep fading" are more likely to be corrupted.

There is yet a further need in the art for retransmission techniques that can accurately predict which packets will need to be retransmitted based on acknowledgements that are sent from a transmission node to a reception node. This capability should increase throughput and reduce delay times while avoiding spurious retransmissions that can degrade the efficiency of the network.

Finally, there is a need in the art for retransmission techniques that incorporate performance enhancing characteristics flexible enough to be incorporated into a variety of communications networks, one of which is a 3G network. Such techniques would take advantage of the fact that deep fading characteristics can cause burst error behavior in other communication network protocols as well.

SUMMARY

The present invention overcomes the above described problems by providing techniques for retransmitting data packets, one of which envisions a device which comprises a transmission unit adapted to retransmit all previously transmitted packets, not just an individual packet, transmitted during a predetermined time interval when a received signal indicates that at least one previously transmitted packet contains corrupted data.

Other features of the present invention will become apparent upon reading the following detailed description of the invention, when taken in conjunction with the accompanying drawings and the appended claims.

DETAILED DESCRIPTION OF THE INVENTION

Those skilled in the art should note that while certain elements of the following invention are referred to as transmission or reception nodes, the functions of these elements can be combined into the same device, program or the like, such as a transceiver. The nomenclature in the discussion above and below is used merely to present features and functions of the invention in a clearer form, rather than to limit any particular device or program that may be utilized to implement the features and functions discussed herein.

Figure 1:
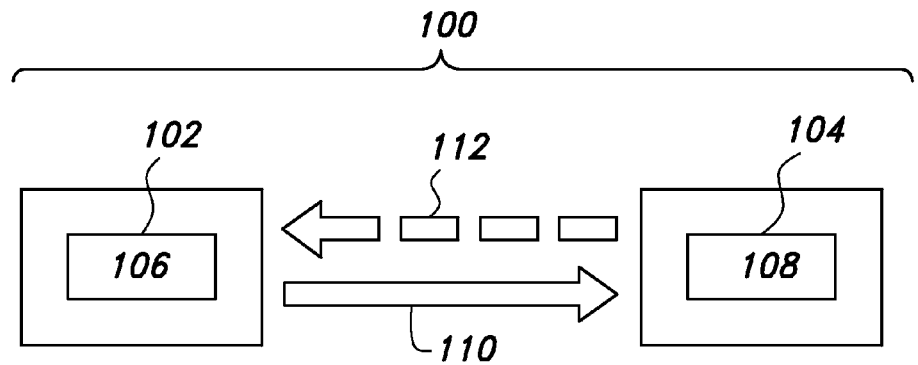
FIG. 1 is a simplified block diagram of a conventional communication network with an acknowledgement channel from a reception node to a transmission node.
Figure 2:
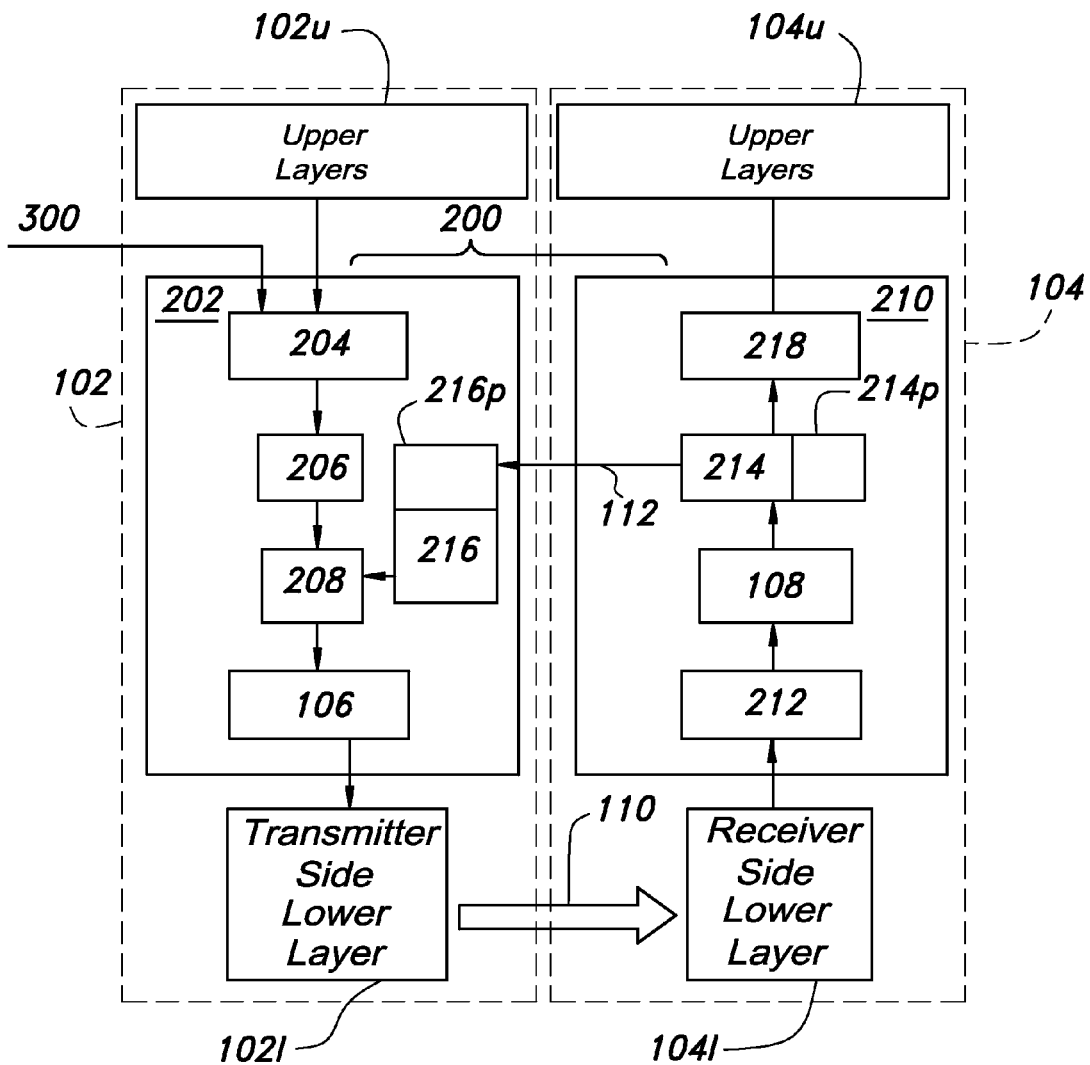
FIG. 2 is a simplified block diagram illustrating elements of an RLC layer which may be used to carry out techniques envisioned by the present invention.

One embodiment of the present invention is implemented within a 3G communication network. However, the present invention is robust enough to be applied to any communication network that displays burst error characteristics. The protocol stack for a preferred 3G communication protocol consists of a few layers, among them the RLC layer, a lower layer and a MAC layer. In one embodiment of the invention, the present invention envisions the retransmission of packets from the RLC layer. In this embodiment, a TTI comprises a predetermined time interval that begins when an RLC layer sends packets to a lower layer for transmission. For ease of understanding, devices 102 and 104 shown in FIG. 2 may be modified to operate according to the present invention as follows.

The inventors have observed that packets, transmitted during a TTI that contains at least one negatively acknowledged packet, are likely candidates for additional transmission errors (i.e., burst error behavior). In one embodiment of the invention, when devices 102 and 104 are a part of, for example, a 3G network, device 102 is adapted to retransmit previously transmitted packets. Because all packets in a 3G network, transmitted during the same TTI, are encoded with the same error correction codes there is a high probability that if at least one packet transmitted during a given TTI experiences a transmission error, other packets transmitted during the same TTI are probable error candidates as well.

Figure 3:
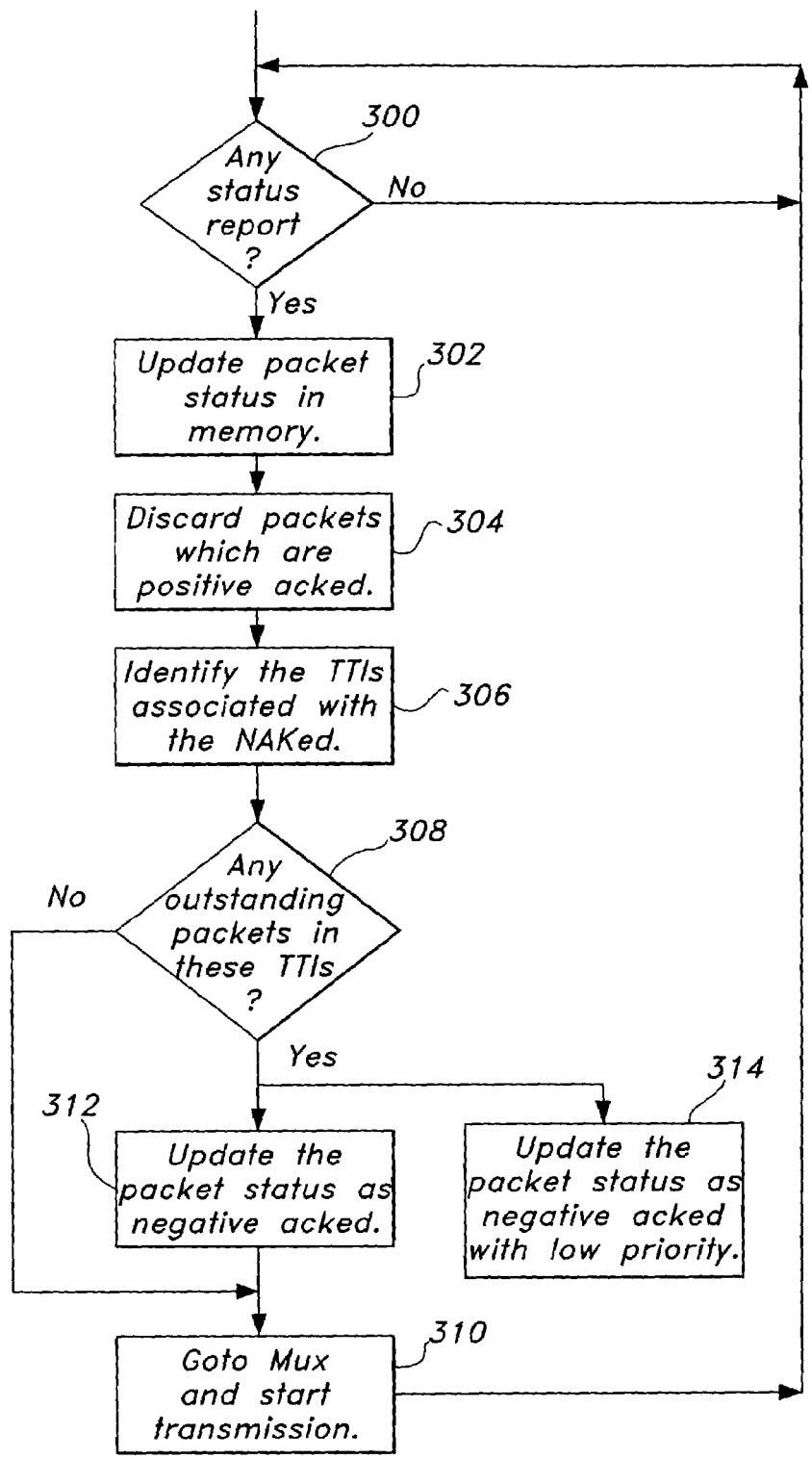
FIG. 3 is a flow diagram illustrative of burst retransmission techniques according to embodiments of the present invention.

One embodiment of the present invention envisions a transmission technique where devices are adapted to select between a first and second retransmission mode. In a "first" mode, the present invention envisions a burst retransmission technique of error correction. Referring now to FIG. 3, there is depicted a flow diagram illustrative of burst retransmission techniques which may be carried out by devices envisioned by the present invention.

As shown, unit 216 may comprise a platform 216$p$ (e.g., hardware, software, firmware or some combination of the three) adapted to update the status of previously transmitted packets in the memory unit 106 in step 302. If a positive acknowledgement has been received from a platform 214$p$ for a particular previously transmitted packet, the platform 216$p$ is adapted to send instructions to memory unit 106 to clear the packet in step 304. Otherwise, previously transmitted packets that have been negatively acknowledged by the acknowledgement unit 214$p$, or previously transmitted packets for which the platform 216$p$ has received no acknowledgement from the acknowledgement unit 214, will remain in the memory unit 106. Next, the platform 216$p$ is adapted to identify the TTIs associated with the negatively acknowledged, previously transmitted packets in the memory unit 106 in step 306. In one embodiment, the platform 216$p$ comprises a reception platform or unit adapted to receive these acknowledgement signals indicative of the status of the previously transmitted packets from the platform 214$p$ described above. It should be understood that the reception platform 216$p$ or unit 216$p$ may be a separate element electronically coupled to the transmission platform 216$p$ or may be combined with the transmission unit 216 to a transceiver.

Next, platform 216$p$ is adapted to store or place all outstanding previously transmitted packets from the same TTI back into the memory unit 106 so they can be available for possible retransmission in step 308. If there are no other outstanding packets from the same TTIs with corrupted data, the platform 216$p$ is adapted to retransmit all previously transmitted packets transmitted during a predetermined time interval when a signal received via channel 112 indicates at least one previously transmitted packet contains corrupted data in step 310. This technique is in contrast to the existing technique of individually retransmitting each packet found to contain corrupted data, wherein the repeated retransmissions often adversely affect network throughput and cause excessive packet delays. The platform 216$p$ may transmit all previously transmitted packets by multiplexing the packets into various transmission channels at the transmission lower layer 102$l$.

If outstanding, unacknowledged (e.g., a previously transmitted packet transmitted during a predetermined time interval for which no positive or negative acknowledgement is generated or received) packets are a part of the same upper layer frame as negatively acknowledged packets, platform 216$p$ is adapted to update the status of each unacknowledged packet to a negatively acknowledged status in step 312. Further, platform 216$p$ is adapted to place previously transmitted packets at the top of a priority stack so they can be transmitted during the next TTI prior to the initial transmission of additional packets. This way, additional packets are delayed until all the negatively acknowledged previously transmitted packets are retransmitted and there are no additional status reports at step 300. When the retransmission of the previously transmitted packets is complete, platform 216$p$ is adapted to restore the delayed additional packets to their position in a transmission queue.

In an alternative embodiment of the present invention, after unacknowledged, previously transmitted packets are updated to a negatively acknowledged status, platform 216$p$ is further adapted to give these packets low priority within the retransmission queue and to retransmit them only if there are no other additional packets available for initial transmission, (e.g., stored in the memory unit 106).

In a negative acknowledgement or "second" mode, previously transmitted packets transmitted during a predetermined time interval, (e.g., TTI) are stored in the memory unit 106 for possible retransmission. The platform 216*p* is further adapted to receive a signal indicative of the status of at least one of the previously transmitted packets from platform 214*p*. If the signal indicates a previously transmitted packet contains corrupted data, platform 216*p* is adapted to retransmit the packet during a next TTI prior to the initial transmission of additional packets.

Figure 4:
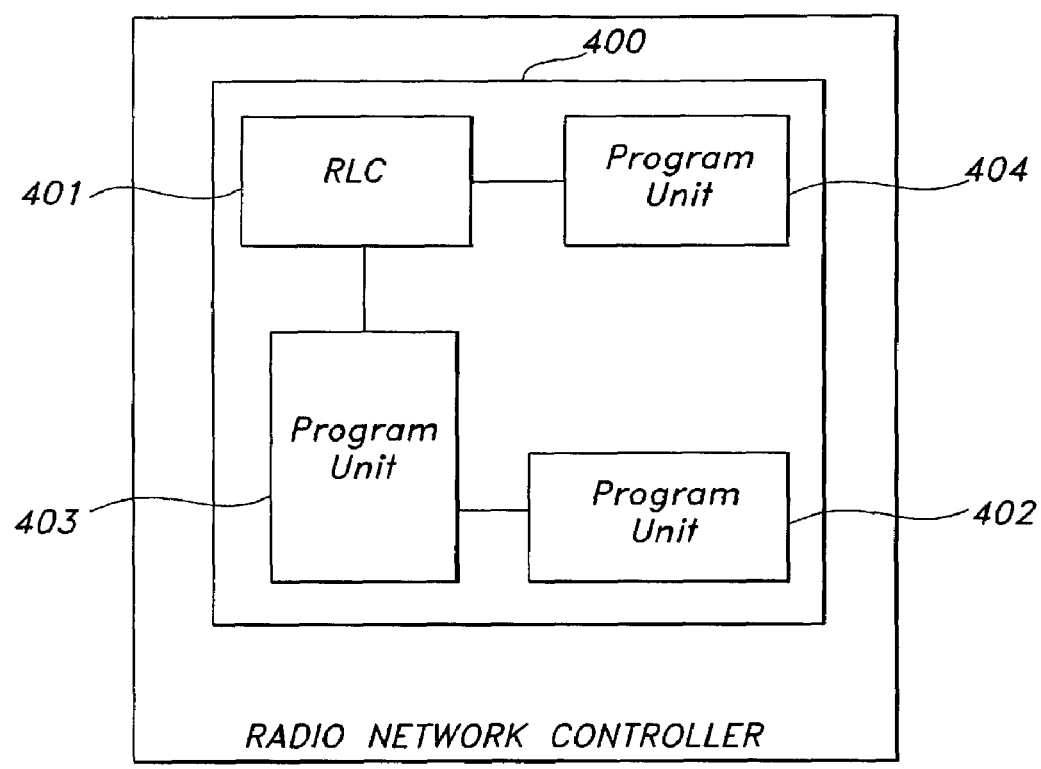
FIG. 4 is a block diagram of a device which implements a burst retransmission technique according to one embodiment of the present invention.

FIG. 4 is a simplified block diagram of a device 400, such as a radio network controller (RNC) adapted to retransmit packets using a burst error retransmission technique according to another embodiment of the present invention. Device 400 may further comprise a traffic processing unit (TPU). TPU 400 may comprise one or more platforms, programs or sections 401-404 for carrying out the features and functions of the present invention described above. TPU 400 may be located within a RNC.

The present invention has been described with regard to particular embodiments, all of which are intended to be illustrative rather than restrictive. Alternate embodiments will become apparent to those skilled in the art to which the present invention pertains without departing from its spirit and scope. For example, some or all of the components in the transmission section 202 and reception section 210 may be combined or further divided in additional sections. Further, each component may comprise a program or programs, hardware or some combination of the two adapted to carry out the features and functions of the inventions described above and below. The scope of the present invention is described by the appended claims and supported by the foregoing description.

We claim:

1. A method for retransmitting packets of data in a radio link control protocol, comprising:
   receiving an acknowledgement signal for each of one or more previously, individually transmitted packets indicating whether a packet is corrupted or not corrupted;
   identifying a transmission time interval (TTI) for each acknowledged, corrupted packet;
   grouping each packet associated with the same TTI together; and
   retransmitting each group of packets from a radio link control layer of a transceiver.

2. The method of claim 1, further comprising:
   updating the status of an unacknowledged, previously transmitted packets to a negatively acknowledged state; and
   retransmitting all packets that were previously, individually transmitted prior to the an initial transmission of additional packets.

3. The method of claim 1, further comprising retransmitting all acknowledged packets that were previously, individually transmitted during a same predetermined time interval, when a received signal indicates at least one previously transmitted packet contains corrupted data, prior to an initial transmission of additional packets.

4. The method of claim 1, further comprising retransmitting an unacknowledged packet that was previously, individually transmitted during a same predetermined time interval, when a received signal indicates at least one previously transmitted packet contains corrupted data, when no additional packets are available for initial transmission.

5. A device for retransmitting packets of data in a radio link control protocol environment, comprising:
   a transceiver operable to:
   receive an acknowledgement signal for each of one or more previously, individually transmitted packets indicating whether a packet is corrupted or not corrupted;
   identify a transmission time interval (TTI) for each acknowledged, corrupted packet;
   group each packet associated with the same TTI together; and
   retransmit each group of packets from a radio link control layer of the transceiver unit.

6. The device of claim 5, wherein the device comprises a traffic processing unit.

7. The device of claim 5, wherein the transceiver unit is operable to:
   update the status of unacknowledged, previously transmitted packets to a negatively acknowledged state; and
   retransmit all packets that were previously, individually transmitted prior to an initial transmission of additional packets.

8. The device of claim 5, wherein the transceiver unit is operable to retransmit all acknowledged packets that were previously, individually transmitted during a same predetermined time interval, when a received signal indicates at least one previously transmitted packet contains corrupted data, prior to an initial transmission of additional packets.

9. The device of claim 5, wherein the transceiver unit is further operable to retransmit an unacknowledged packet that was previously, individually transmitted during a same predetermined time interval, when a received signal indicates at least one previously transmitted packet contains corrupted data, when no additional packets are available for initial transmission.

* * * * *